United States Patent Office 3,336,298
Patented Aug. 15, 1967

3,336,298
SEPARATION OF LACTAMS FROM A STRONG
SULPHURIC ACID MEDIUM
Abraham H. de Rooij, Geleen, Netherlands, assignor to
Stamicarbon N.V., Heerlen, Netherlands
No Drawing. Filed Mar. 3, 1965, Ser. No. 436,912
Claims priority, application Netherlands, Mar. 7, 1964,
64—2,370
6 Claims. (Cl. 260—239.3)

The present invention relates to the separation of lactams from a concentrated sulphuric acid medium.

It is well-known that lactams can be obtained by Beckmann rearrangement of alicyclic oximes, the rearrangement preferably being effected in a concentrated acid medium. In practice the rearrangement of cyclohexanone oxime to ε-caprolactam, the lactam which is produced the most at the present time, is more often than not carried out with oleum, which contains about 6% by weight of free $SO_3$ using a temperature of about 125° C.

It has also been proposed to prepare lactams by nitrosating, in a concentrated sulphuric acid medium, compounds having a cyclo alkyl nucleus containing a tertiary C atom.

With either of the above procedures, the lactam formed, which is a very weak organic nitrogen base, is in the socalled conjugated acid form, bound to sulphuric acid. Accordingly, in order that the lactam may be separated from the acid reaction mixture, this mixture is usually reduced to a pH value of about 4.5 by means of ammonia water. This releases the lactam from the conjugated acid form, the thus released lactam floating on the resulting ammonium sulphate solution. Thereafter separation of the lactam layer from the ammonium sulphate solution is effected.

A disadvantage of the abovedescribed method of separating the lactam from the reaction mixture is that the oleum or sulphuric acid used in the preparation of the lactam is completely converted to ammonium sulphate. As a result, the Beckmann rearrangement of, e.g., cyclohexanone oxime, results in the formation of about 1.8 tons of ammonium sulphate per ton of ε-caprolactam produced. Since ammonium sulphate is readily available and only a low price can be obtained for it in, for example, the nitrogen fertilizer market, the formation of such a by-product is particularly unattractive.

The principal object of the present invention is to provide a process which avoids the abovenoted disadvantage of the prior art and is otherwise attractive from the commercial standpoint. Other objects will also be hereinafter apparent.

In the present process, the degradation of sulphuric acid or oleum to sulphate after the rearrangement of oxime to lactam or after the formation of the lactam by a nitrosation reaction is avoided. More particularly, the lactam is separated from a solution which contains almost all of the original amount of free sulphuric acid, so that this solution can be used advantageously elsewhere in view of its free acid content, e.g. in the absorption of $NH_3$ from coke oven gases or in the decomposition of phosphate rock.

The invention is based on the discovery that, generally speaking, very weak organic nitrogen bases which, in a cencentrated sulphuric acid medium, are completely in the conjugated acid form, will be converted to a large extent into the free base form if the acidity of the medium is lowered without the medium losing its pronouncedly acid reaction. This may be achieved in the case of a concentrated sulphuric medium by adding an amount of ammonium sulphate and a little water necessary for dissolving the ammonium sulphate, so that a solution of ammonium sulphate and sulphuric acid, essentially a solution containing ammonium bisulphate, is formed.

To attain the degree of acidity necessary for releasing the free base, the sulphuric medium need not contain exactly equimolecular amounts of ammonium sulphate and sulphuric acid. Thus, it suffices to use a molar ratio of ammonium sulphate to sulphuric acid to a value of 0.75:1.

According to the invention, therefore, lactams in a concentrated sulphuric acid medium which, if desired, may contain free $SO_3$, are converted to the free base by addition of ammonium sulphate and water in such amount that the moler ammonium sulphate: sulphuric acid ratio in the medium is brought to a value of at least 0.75:1, after which the released lactam is separated from the acid solution containing ammonium sulphate.

The separation of the released lactam can be effected by extraction with an organic solvent which has a high capacity for dissolving lactams but in which sulphuric acid, ammonium bisulphate and ammonium sulphate are virtually insoluble. This includes such solvents as benzene, toluene, 1,2-dichloroethane, chloroform, ethyl ether and dibutyl carbitol.

If the molar ratio between ammonium sulphate and sulphuric acid in the medium has been brought to a value greater than 1.1:1, it appears that, depending upon other conditions, in particular a low water content, preseparation of crude lactam from the strongly acid solution containing ammonium sulphate can occur automatically. Thus, if the solution is sufficiently concentrated (e.g. it contains not more than 45% by weight of water), two layers are formed, namely, an impure lactam layer and a solution containing ammonium sulphate. After separation of these two lyers, the impure lactam layer may then be taken up in an organic extraction agent, in which process the impurities are left behind. Naturally, this requires less extraction agent than would be needed if preseparation does not occur and the lactam must be extracted directly from the solution containing lactam, ammonium sulphate and sulphuric acid. For this reason, it is usually preferred to add an amount of water which will give the medium a water concentration of 30 to 40% by weight although greater concentrations, e.g. up to 45%, may be effectively used as long as the indicated ratio of sulphate to sulphuric acid is observed.

As indicated above, one advantage of the present invention is the retention of the sulphuric acid used in the preparation of lactam e.g. by rearrangement of oxime so that this sulphuric acid may afterwards be used for other purposes. To this end, it is recommended not to add too much ammonium sulphate to the reaction medium over and above the amounts indicated above. Preferably, the molar ratio of ammonium sulphate to sulphuric acid should not rise above a value of 2:1 although the addition of even more ammonium sulphate is by no means detrimental to the separation of the free lactam base.

The invention is illustrated, but not limited, by the following example:

1000 kg. of cyclohexanone oxime were rearranged at 125° C. with 1350 kg. of oleum containing 6% by weight of free $SO_3$, to form ε-caprolactam.

After the rearrangement, 2700 kg. of ammonium sulphate and 3050 kg. of water were added to the mixture. The molar ammonium sulphate: sulphuric acid ratio in the resulting solution was 1.45:1. The solution was extracted with 9400 kg. of benzene flowing in countercurrent, in which process there resulted, on the one hand, 10600 kg. of benzene extract with 1000 kg. of lactam and 200 kg. of water and, on the other, 6900 kg. of a solution containing ammonium sulphate and sulphuric acid, with 1370 kg. of free sulphuric acid. This solution of ammonium sulphate and sulphuric acid was used to decompose 1400 kg. of phosphate rock to a solution containing ammonium sulphate and phosphoric acid.

It will be recognized that various modifications may be made in the invention described herein. Thus, while the invention has been specifically described in the foregoing example with reference to the preparation of ε-caprolactam using oleum for the oxime rearrangement, other lactams may also be processed in the manner described herein when the lactam is present in conjugated acid form. For example, the oxime used as starting material may be other cycloalkanone oximes such as cyclopentanone or cycloheptanone oxime. Additionally, the lactams treated may be those obtained by nitrosating in acid medium rather than by rearrangement. Hence, the scope of the invention is defined in the following claims wherein:

I claim:

1. A process of separating a lactam from a concentrated sulphuric acid medium which comprises adding ammonium sulphate and water in such an amount that the molar ratio between ammonium sulphate and sulphuric acid in the medium will reach a value of at least 0.75:1, whereby a substantial portion of the lactam is converted to the free base, and separating this lactam from the strongly acid solution containing said ammonium sulphate.

2. Process according to claim 1 wherein the separation of lactam is effected by extraction with an organic solvent which has a high capacity for dissolving lactam, but in which sulphuric acid, ammonium bisulphate and ammonium sulphate are virtually insoluble.

3. Process according to claim 1 wherein the molar ratio of ammonium sulphate to sulphuric acid does not exceed 2:1.

4. Process according to claim 1 wherein the lactam is prepared by Beckmann rearrangement of a cycloalkanone oxime is concentrated sulphuric acid medium.

5. Process according to claim 1 wherein the acid medium is oleum containing free $SO_3$.

6. Process according to claim 1 wherein the lactam is caprolactam.

References Cited
UNITED STATES PATENTS

| | | | |
|---|---|---|---|
| 2,249,177 | 7/1941 | Schlack | 260—239.3 |
| 2,313,026 | 3/1943 | Schlack | 260—239.3 |
| 2,605,261 | 7/1952 | Kahr | 260—239.3 |

WALTER A. MODANCE, *Primary Examiner*

ROBERT T. BOND, *Assistant Examiner.*